United States Patent [19]

Grabkowski et al.

[11] Patent Number: 4,609,806
[45] Date of Patent: Sep. 2, 1986

[54] METHOD AND APPARATUS FOR DETERMINING WELD QUALITY IN PERCUSSION WELDING

[75] Inventors: Stephen E. Grabkowski, Schenectady; Max W. Schulz, Jr., Scotia, both of N.Y.; Robert D. Williamson, Bloomington, Ill.

[73] Assignee: General Electric Company, Schenectady, N.Y.

[21] Appl. No.: 779,005

[22] Filed: Sep. 23, 1985

[51] Int. Cl.4 .............................................. B23K 9/22
[52] U.S. Cl. ........................................ 219/95; 219/109
[58] Field of Search ................... 219/109, 110, 95, 96, 219/86.32, 86.41, 86.51

[56] References Cited

U.S. PATENT DOCUMENTS

| | | | |
|---|---|---|---|
| 2,864,054 | 12/1958 | Boyle et al. | 219/95 |
| 3,433,921 | 3/1969 | Peterson | 219/110 |
| 3,462,577 | 8/1969 | Helms et al. | 219/78 |
| 3,497,661 | 2/1970 | Comstock | 219/96 |
| 4,296,304 | 10/1981 | Defourny | 219/86.41 |
| 4,390,770 | 6/1983 | Kohler et al. | 219/56.21 |
| 4,419,558 | 12/1983 | Stiebel | 219/109 |
| 4,447,699 | 5/1984 | Gold et al. | 219/110 |

OTHER PUBLICATIONS

American Society for Metals, "Percussion Welding", *Metals Handbook Ninth Edition,* vol. 6, Welding, Brazing, and Soldering, pp. 739-745.

*Primary Examiner*—Clifford C. Shaw
*Attorney, Agent, or Firm*—Paul R. Webb, II; James C. Davis, Jr.

[57] ABSTRACT

The quality of welds produced during a percussion welding process are determined in real time by sensing the vibrational impulse signals produced during the percussion welding process, filtering the impulse signal to select a frequency band containing frequency components associated with the vibrations imparted to the forge rod of the welding machine, measuring the mechanical damping characteristics of the selected spectral portion of the signal by determining the log-decrement of the envelope of the signal, and comparing the measured log-decrement value obtained with a preselected threshold value.

20 Claims, 7 Drawing Figures

METHOD AND APPARATUS FOR DETERMINING WELD QUALITY IN PERCUSSION WELDING

BACKGROUND OF THE INVENTION

Percussion welding is a well-known arc welding process for joining metal workpieces in which very intense but extremely brief and localized heat is obtained from an arc produced by a rapid discharge of electrical energy, and force is percussively applied during or immediately after the electrical discharge to impact the workpieces together. A shallow layer of metal on the contact surfaces of the workpieces is melted by the heat of the arc. Upon the workpieces being impacted against each other, the arc is extinguished, expelling molten metal and completing the weld.

Close control of parameters such as welding current and impact velocity are important for producing a good weld. The welding current amplitude and pulse shape may be controlled by a variety of methods such as varying the amount of energy stored in the system. Another method is to control the start and duration of a portion of the current cycle provided by an A.C. welding transformer. These methods determine the heating capacity of the arc. The impact velocity is related to the mass of the moving workpiece and the workpiece clamping member of the machine, and determines the amount of forging force. The forging force must be great enough to accelerate one of the workpieces being welded to a high velocity within the short gap of the machine, and is generally adjusted empirically until the desired weld quality is obtained. Conditions are usually adjusted to give the shortest arc time that will permit consistent production of welds with desired properties. If the parts being welded are forced together too soon, the arc will be extinguished before the work surfaces of the parts are melted. If the impact is delayed too long after arc initiation, the melted interfaces may solidify too soon to permit expulsion of excess molten metal. In both cases, poor fusion and bonding of the parts results.

It is important to be able to determine reliably the quality of the welds produced by percussion welding to detect defective welds, particularly in an automated process where parts are fed automatically to the welding machine. Experienced operators can often tell by the sound produced during welding that a weld is defective. However, this is not a very reliable approach and is not practical for an automated process. Other known approaches for detecting defective welds have involved monitoring the time-varying welding current and comparing the current time duration or amplitude characteristics to preselected criteria. While such current monitoring techniques are capable of detecting a substantial number of defective welds, they have a number of disadvantages.

It is desirable to provide techniques for detecting defective welds in real time and at high speed which are more sensitive and more reliable, and which are readily adaptable to an automated welding process. It is to this end that the present invention is directed.

SUMMARY OF THE INVENTION

The invention is based upon the discovery that a very sensitive way of monitoring a percussion welding process to determine weld quality is to sense the vibration produced during the welding process and to use this to determine the mechanical damping characteristics of the weld process. As operating conditions and welding parameters change, the mechanical damping characteristics also change. In general, it has been found that vibrations which characterize high damping are associated with good welds, whereas vibrations which characterize low damping are indicative of faulty welds with poor bonding and fusion between the parts. By comparing the measured damping from characteristics of the vibration signal to an empirically determined damping, defective welds may be quickly and reliably detected.

Briefly, in accordance with the invention, a vibration signal produced during percussion welding is sensed; the damping characteristics of the signal are measured; and the measured damping characteristics are compared with a predetermined damping characteristic to determine the quality of the weld.

Preferably, the damping characteristics measured are those of a preselected spectral portion of the signal. More specifically, the vibration signal of interest is that associated with the forging rod of the welding machine which impacts the parts being welded together. The vibration signal produced during welding is an impulse signal composed of a plurality of frequency components, some of which are associated with secondary resonances and vibrations of welding machine components which have little or no relationship to the weld. Other frequency components, however, are associated with the vibrations of the forging rod and are influenced by the welding parameters. It is these latter frequency components which are of particular interest. Accordingly, the damping characteristics of the vibration impulse signal which are measured are preferably those of a preselected spectral portion of the signal containing frequencies associated principally with the forging rod vibrations so as to avoid interference or masking of the damping characteristics by secondary resonances and vibrations. A convenient measure of the damping characteristics of the preselected portion of the signal is the log-decrement of the envelope of the signal waveform. The value of the log-decrement may be compared to a predetermined threshold value selected to discriminate between acceptable and unacceptable welds.

Other more specific aspects and features of the invention will become apparent from the following description.

DESCRIPTION OF THE PREFERRED EMBODIMENT

Figure 1:
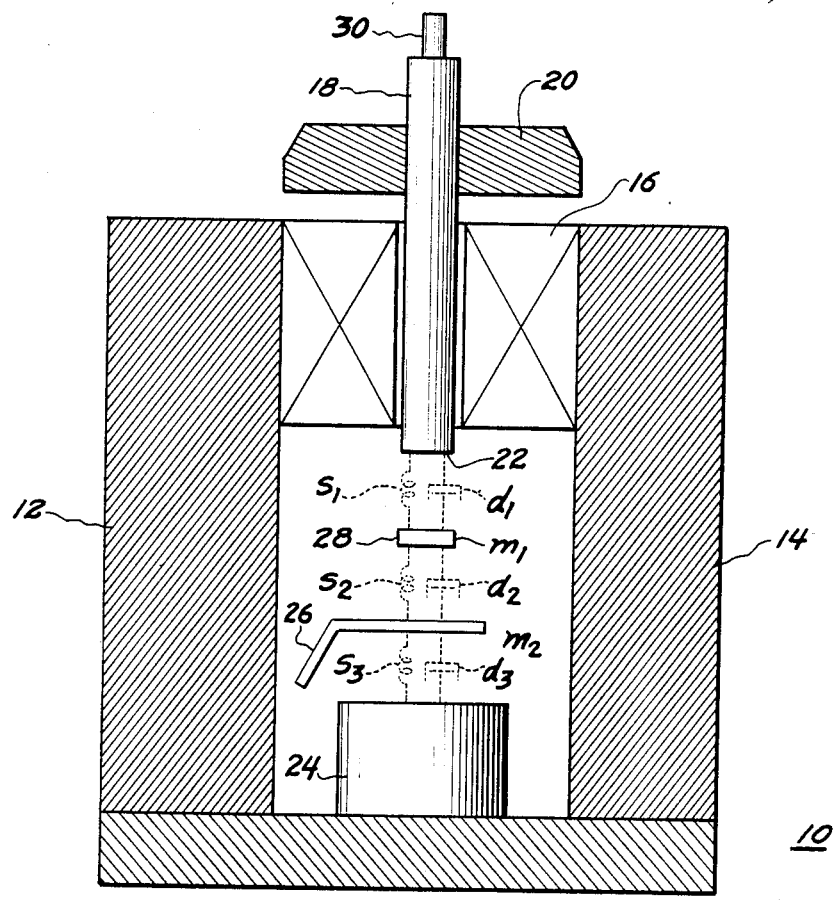
FIG. 1 is a simplified diagrammatic view of a percussion welding machine of the type with which the invention may be employed, the figure illustrating schematically the vibrational components of the mechanical interface between the machine and the parts being welded.

FIG. 1 illustrates diagrammatically a percussion welding machine of the type with which the invention may be employed. As indicated in the figure, the machine may include a main frame comprising a base 10 and upstanding side frame portions 12 and 14. In a typical percussion welding machine, the main frame is generally quite heavy and massive in order to inhibit flexing during a welding process. A forge magnetic coil 16 may be supported between the frame portions 12 and 14 at the top thereof, and a forge rod 18 may be passed through the center of the magnetic coil. The forge rod may have a disk 20 located thereon above the forge coil. Magnetic field applies force to disk and accelerates the forge rod. The disk is used for calibrating the forging process, and the proximity of the disk to the forge magnetic coil determines the amplitude of the force and timing when forging takes place. The forge rod may be biased upwardly by a spring mechanism (not illustrated) to form a gap between the lower end 22 of the forge rod and a lower clamp assembly 24 located on base 10. As is well known, the lower clamp assembly may have movable jaws (not illustrated) or other means for securely holding one of the parts 26 which is to be welded. The other part 28, which is to be welded to part 26, may be held against the lower end 22 of the forge rod by air suction, for example, as by forming the lower end with apertures which are in communication with an air suction pump or the like, which are also not illustrated. (In the figure, parts 26 and 28 are shown separated from the lower clamp assembly and the lower end of the forge rod for reasons which will be explained shortly.) For purposes of illustrating the invention, part 28 may comprise a silver or silver alloy pellet which is to be welded to a resilient metal carrier 26 (as of copper and brass) to form a movable relay contact.

During initiation of a weld cycle, the forge rod assembly, containing some form of downward loading (air pressure, springs, CAM), is lowered so as to make contact between pellet 28 and carrier 26. An arc produced by a rapid discharge of electrical energy (welding transformer, capacitors) passes through the silver pellet and carrier. A shallow layer of metal on the contact surfaces in the workpieces is melted by the heat of the arc produced between them. A fraction of a second later the forging process takes place. The amount of current through the forge magnetic coil determines the impact velocity and the forging force which is applied to the parts. Arc initiation, arc time, and forging force are parameters which are controlled and synchronized by the welding machine. As noted earlier, if the parts are forced together too soon, the arc will be extinguished before the work surfaces are melted, and if the impact is delayed too long after arc initiation, the melted interfaces may solidify too soon to permit expulsion of excess molten metal. In both cases poor fusion and bonding between the parts will result.

As previously indicated, the invention monitors the quality of the welds produced by sensing the vibrations imparted to the forge rod during welding and measuring the damping characteristics of the vibrations. The damping characteristics of the vibrations will change as changes occur in the welding parameters. As indicated schematically in FIG. 1, during welding the mechanical interfaces between the forge rod and the silver pellet 28, between the silver pellet and the carrier 26, and between the carrier and the lower clamp assembly 24 may be considered to be a mechanical circuit comprising a pair of masses $m_1$ and $m_2$ corresponding, respectively, to silver pellet 28 and carrier 26 which are connected together and to the forge rod and lower clamp assembly by springs ($s_1$–$s_3$) and dashpots ($d_1$–$d_3$), as indicated in phantom lines in the figure. The mechanical interface between carrier 26 and the lower clamp assembly 24 may be assumed to be substantially rigid, and it may be further assumed that the damping of the vibration imparted to the forge rod will be principally a function of the mechanical interfaces between the carrier and the silver pellet and between the silver pellet and the forge rod. The vibrations imparted to the forge rod may be sensed by a vibration sensor 30 which is affixed to the top of the forge rod as shown in FIG. 1. Other locations on the forge rod have been used successfully when access to the top was not convenient. The vibration sensor may comprise an accelerometer, such as a Bruel and Kjaer Type 4344 accelerometer, which has a flat frequency response beyond approximately 33 kHz. The accelerometer may be attached to the forge rod using dental cement, for example, in order to provide electrical isolation. The vibrations sensed by the accelerometer during the percussion welding process are converted to electrical signals, and the electrical signals may be processed in a percussion welding monitor system, such as shown in FIG. 2, to determine weld quality.

Figure 2:
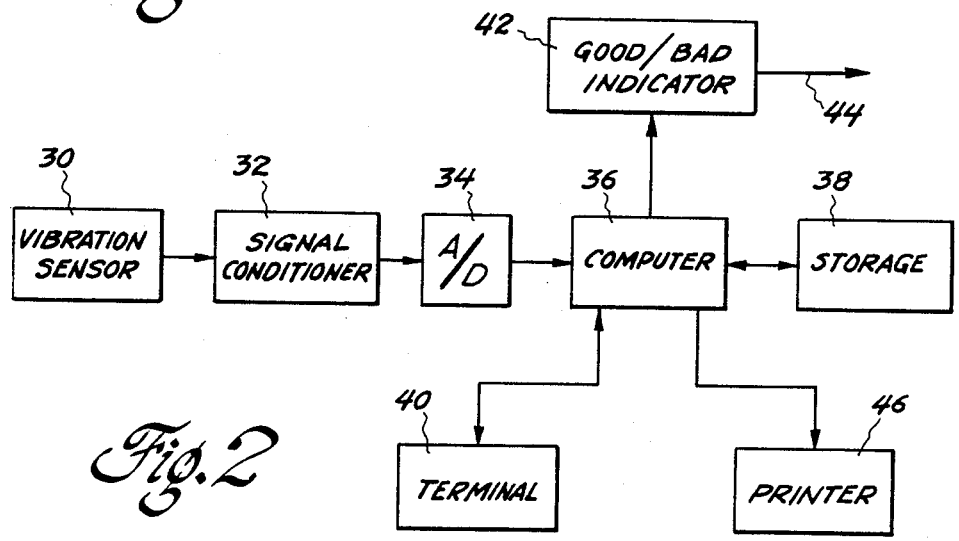
FIG. 2 is a block diagram illustrating a percussion welding monitoring system in accordance with the invention.

As shown in FIG. 2, the electrical signals from the accelerometer 30, i.e., vibration sensor, may first be supplied to a signal conditioner 32, which may comprise an amplifier, and then to an analog-to-digital converter (A/D) 34, which converts the analog signals produced by the accelerometer into digital signals. The digital signals from the A/D converter, which constitute raw vibrational signals in digital form, may be supplied to a processing system comprising a computer 36, a storage device 38 such as floppy disks, a terminal 40, and a good/bad weld indicator 42 which may provide a visual and/or audible output when a bad weld is detected. The indicator may also provide an output signal on a line 44 for further machine control upon a bad weld being detected. If desired, the processing system may also include a printer 46 for providing a hard copy printout. The computer 36, which may be a microcomputer such as a PDP 11/73, and the A/D converter are selected to enable raw signals having a frequency content at least equal to that of the accelerometer, i.e., 33 kHz, to be recorded. The computer processes the raw signals, in a manner which will be explained shortly, to measure the mechanical damping characteristics of the vibration signals. The damping characteristics are then compared to an empirically determined reference damping characteristic (the derivation of which will also be described shortly). Based upon the comparison, a determination of the weld quality is made, and an appropriate indication is provided by indicator 42. In general, good welds have been found to be associated with forge rod/pellet/carrier mechanical interface vibrations which exhibit high damping characteristics, whereas bad welds have been found to be associated with vibrations which exhibit lower damping characteristics. Particularly advantageous is the fact that the damping characteristics are independent of vibrational signal amplitude, thereby rendering unnecessary calibration of the accelerometer or steps to control gains in the signal path.

As will be appreciated by those skilled in the art, the raw vibrational signals produced during welding are impulse signals which have a rather complex amplitude-time-frequency distribution. In addition to containing frequency components related to the vibrations associated with the forge rod/pellet/carrier mechanical interface, the signals will also contain frequency components associated with welding machine resonances and vibrations which are not directly associated with the quality of the weld. It is desirable to eliminate the frequency components of the impulse signal associated with these secondary vibrations since this improves the signal-to-noise ratio of the components of interest and permits a more accurate determination of damping characteristics. Fortunately, the frequencies of these secondary vibrations will generally tend to be rather constant and can be determined in advance. Once the frequency components associated with secondary vibrations are determined, the impulse signal may be filtered to eliminate many of these secondary components and to restrict the spectral portion of the impulse signal which is subsequently processed to a band of frequencies which are principally associated with the vibrations of the forge rod during welding. Preferably, the impulse signal is filtered digitally within computer 36, rather than with an analog filter, since this enables filter ringing to be minimized and enables the filter to be readily tailored to the individual welding machine and to the parts being welded.

Within the computer, the filtered signal may be processed by full-wave rectifying the signal, i.e., taking its absolute value, and the damping characteristics of the rectified signal determined by determining the log-decrement of the envelope of the signal, as will be described. The log-decrement value obtained may then be compared to an empirically determined preselected threshold value to determine the quality of the associated weld. If the measured log-decrement value exceeds the preselected threshold value, the weld may be classified as good. If, instead, the value is below the preselected threshold value, the weld may be classified as defective.

Figure 3:
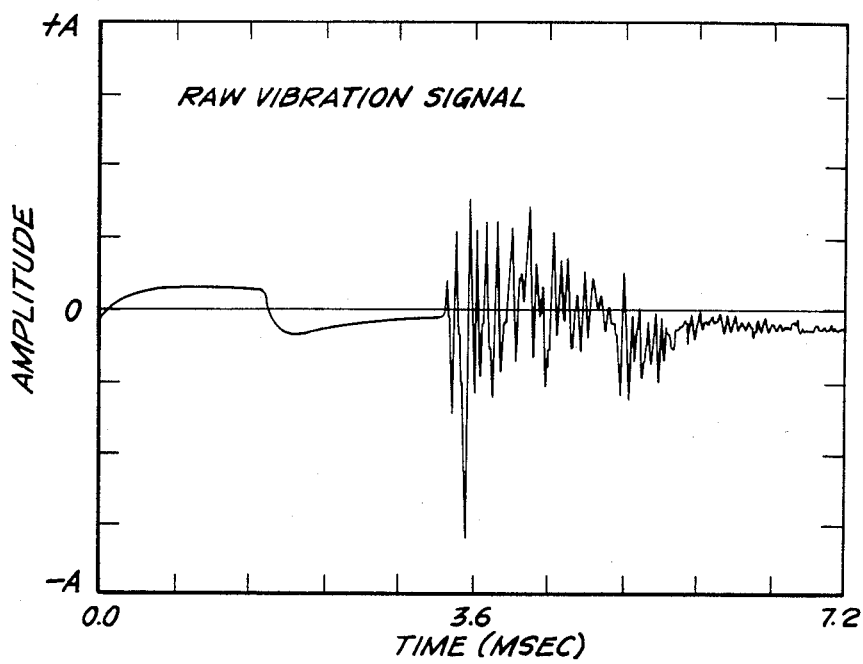
FIG. 3 is a representative amplitude-time plot of a typical raw vibration signal produced during welding.
Figure 4:
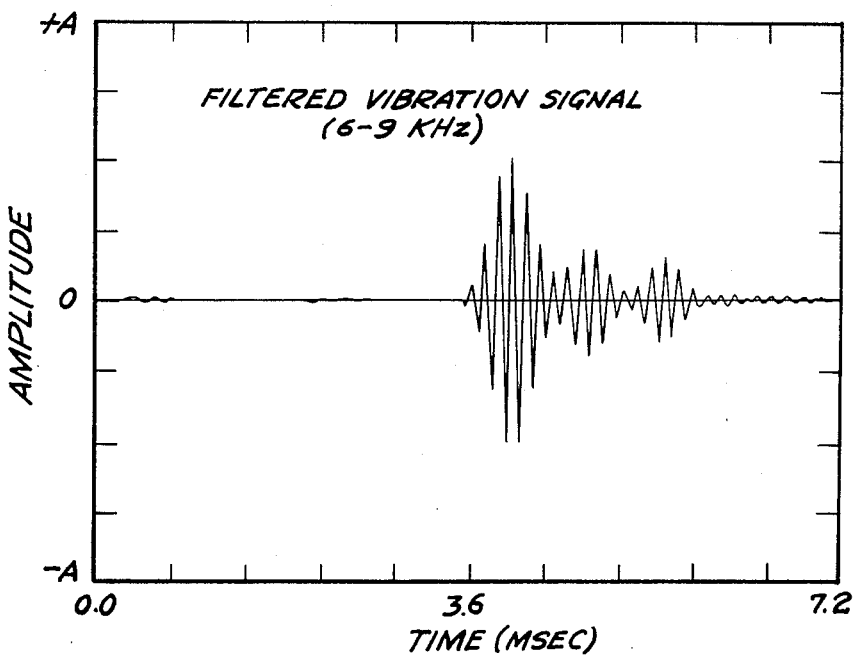
FIG. 4 is an amplitude-time plot of the signal of FIG. 3 after filtering.

As an illustration of the invention, a series of test welds of silver pellets to copper-brass carriers was made using a commercially available Teledyne Precision-Cincinnati percussion welder. Welds were made with different settings of weld control parameters in order to produce welds of various quality, and vibration data were obtained for each weld. FIG. 3 is an amplitude-time plot of a typical raw vibrational signal which was obtained (for a good weld). In order to determine the frequency components of the raw vibrational signals which are related to the damping characteristics of interest, the raw vibrational signals may be analyzed in any of a number of different ways to identify the frequency components which exhibit the greatest variations with variations in welding parameters. For the test welds, the raw vibrational signals were subjected to a known form of computerized signal processing to produce a three-dimensional plot of the frequency distribution of each signal as a function of time and amplitude. The plots were then further processed in a conventional manner to produce a three-dimensional display with time as the ordinate, frequency as the abscissa, and magnitude in color. This display format made it particularly easy to identify the region in the frequency domain which exhibited the greatest changes for different weld parameters. For the percussion welder used and the parts being welded, the frequency band from 6 to 9 kHz was found to exhibit the greatest activity for variations in the weld parameters. Accordingly, a digital bandpass filter with frequency cutoffs at 6 kHz and 9 kHz was implemented in the computer and the raw signals were filtered by the digital filter. FIG. 4 is an amplitude-time representation of the raw signal of FIG. 3 after filtering.

Figure 5A:
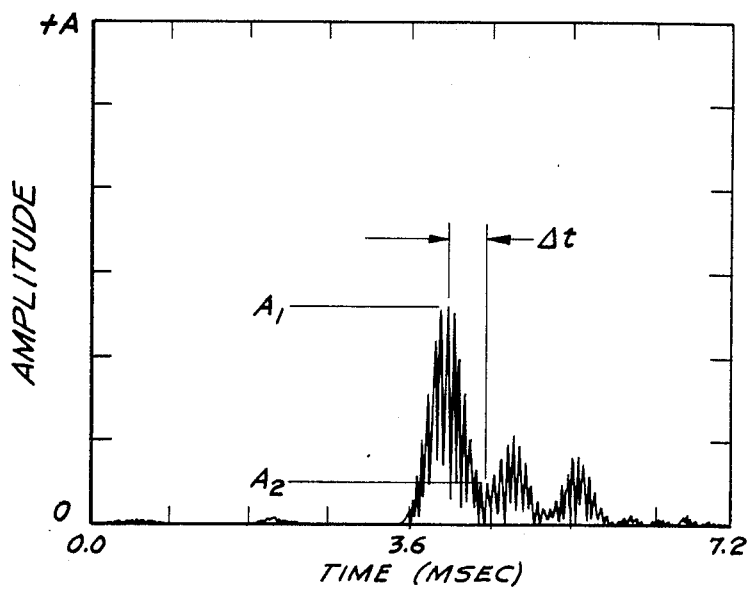
FIGS. 5A and B are, respectively, absolute value of amplitude-time plots of the signal of FIG. 4, which correspond to an acceptable weld and to another filtered raw vibration signal which corresponds to an unacceptable weld, after further processing.
Figure 5B:
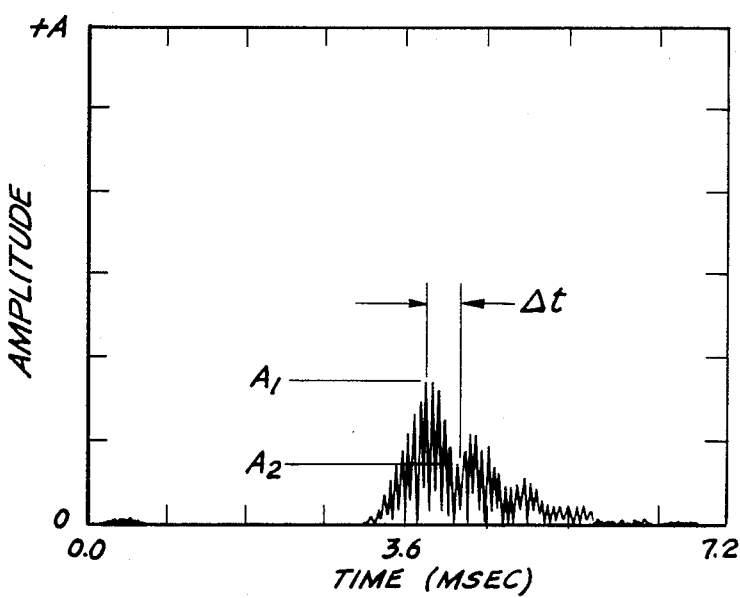

After filtering, the absolute value of the signal was obtained, which is equivalent to full-wave rectification of the signal. FIG. 5A is an amplitude-time representation of the absolute value of the signal of FIG. 4. For comparison purposes, FIG. 5B illustrates the absolute value of a filtered raw signal which corresponds to a bad weld. As can be seen by comparing FIGS. 5A and 5B, the signal of FIG. 5A (which corresponds to the good weld) exhibits higher damping characteristics than does the signal of FIG. 5B.

In order to quantify the damping characteristics, the log-decrement of the envelopes of the signals was next determined. The log-decrement, which is a well established measure of the damping of a mechanical oscillatory system responding to an impact, may be expressed as:

$$DB = 20 \log_{10} \frac{A_1 - A_2}{t_1 - t_2}$$

where $A_1$ is the maximum amplitude of the signal envelope,
$A_2$ is the minimum amplitude of the signal envelope,
$t_1$ is the time at which $A_1$ occurs, and $t_2$ is the time at which $A_2$ occurs.

To determine the log-decrement of each of the vibrational signals produced during the test welds, a software program was written to search for the maximum peak in the rectified signal. The amplitude of the maximum peak was taken to be the value $A_1$. Once the maximum peak was established, a search was conducted of descending peaks until the minimum peak was found. The minimum peak was determined when the next successive peak was found to be equal to or greater in magnitude than the previous peak. The magnitude of the first minimum peak located was taken as the value $A_2$ and the absolute value of the time between the maximum and minimum peaks $\Delta t = (t_1 - t_2)$ was determined. The value of the log-decrement was then calculated using the above equation. This process is illustrated in FIGS. 5A and B. Other amplitude - time pairs within the maximum to minimum interval may be used for it is the slope which is important. Maxima and minima are preferred because they usually provide the best accuracy.

Advantageously, the log-decrement as a measure of the characteristics of the mechanical damping of the system is independent of the raw signal amplitudes. Accordingly, absolute calibration of the accelerometer and control of the gains of the signal path is unnecessary. Moreover, the log-decrement is rather easily determined, in real time, using a computer.

Figure 6:
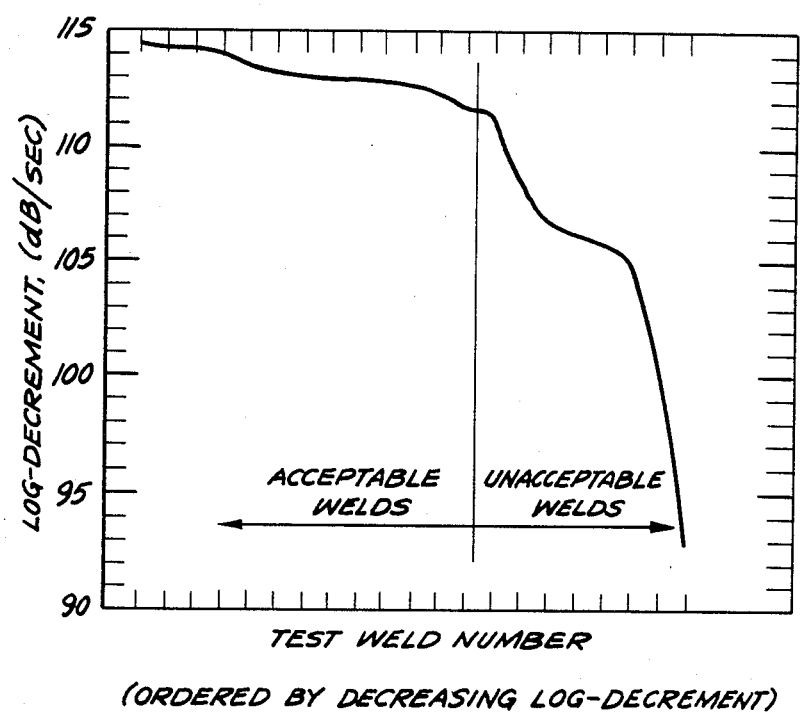
FIG. 6 is a plot illustrating a typical variation in log-decrement between acceptable and unacceptable welds.

Next, each of the welds produced during the test was ultrasonically tested to determine the degree of bonding and fusion between the silver pellet and the carrier in order to characterize the weld as either acceptable or unacceptable. A plot was then constructed of the log-decrement values of the test samples ordered in terms of decreasing log-decrement. This is illustrated in FIG. 6. Based upon the ultrasonic testing of the welds, it was found that weld samples having log-decrement values less than approximately 112 dB/sec exhibited poor bonding and fusion and were considered unacceptable, while those weld samples having log-decrement values greater than that number were acceptable. This demonstrates that weld quality may be determined on the basis of the measured log-decrement of associated vibration signals, and that good and bad welds may be discriminated readily by comparison of the log-decrement value of their associated forge rod vibrations with a preselected threshold value (112dB/sec, for example, for the test welds).

From the foregoing, it will be seen that the invention affords a rather convenient and reliable method of determining, in real time, the quality of welds produced during a percussion welding process. As will be appreciated by those skilled in the art, the threshold value of log-decrement used to discriminate between good and bad welds will depend upon the particular parts being welded. Moreover, the particular frequency region of the raw signals which is associated principally with forge rod vibrations will also vary depending upon the parts being welded, as well as for different welding machines. For any particular welding machine and any particular parts, the frequency region of the raw signals which best characterizes the forge rod vibration and the log-decrement threshold value may be readily determined empirically as described above. Furthermore, a series of threshold log-decrement values may be established, if desired, in order to classify the welds in terms of their degree of acceptability or unacceptability.

While a preferred embodiment of the invention has been shown and described, it will be appreciated by those skilled in the art that changes may be made in this embodiment without departing from the principles and spirit of the invention, the scope of which is defined in the apended claims.

What we claim as new and desire to secure by Letters Patent of the United States is:

1. A method of determining the quality of welds produced by a percussion welding process using a percussion welding machine including a movable forging member which comprises sensing a damped vibration impulse signal produced during the percussion welding; measuring a damping characteristic of the signal; comparing the measured damping characteristic with a predetermined damping characteristic; and determining the quality of the weld on the basis of said comparing.

2. The method of claim 1, wherein said sensing comprises sensing the acceleration of the forging member of the percussion welding machine during welding.

3. The method of claim 1 further comprising selecting a predetermined spectral portion of the signal, and wherein said measuring comprises measuring the mechanical damping characteristic of the selected portion.

4. The method of claim 3, wherein said selecting comprises filtering the signal to limit the signal to a band of frequencies characteristic of the mechanical damping during welding of a forging member of the percussion welding machine.

5. The method of claim 3, wherein said measuring comprises measuring a quantity related to the time rate of change of the magnitude envelope of the selected portion of the signal.

6. The method of claim 5, wherein said quantity comprises the log-decrement, the damping characteristic of the selected portion of the signal.

7. The method of claim 6, wherein said comparing comprises comparing the log-decrement quantity to a predetermined threshold value, and wherein said determining comprises determining that the weld is defective when the log-decrement quantity is less than the predetermined threshold value.

8. The method of claim 1 further comprising providing an indication upon determining a weld to be defective.

9. Apparatus for determining the quality of welds produced by a percussion welding machine including a movable forge member comprising means for sensing a damped vibration impulse signal produced during percussion welding; means for measuring a damping characteristic of the signal; means for comparing the measured damping characteristic with a predetermined damping characteristic; and means responsive to the comparing means for determining the quality of the weld.

10. The apparatus of claim 9, wherein said sensing means comprises an accelerometer affixed to the movable forge member of the percussion welding machine.

11. The apparatus of claim 10, wherein said measuring means comprises means for measuring a preselected spectral portion of the signal.

12. The apparatus of claim 11, wherein said measuring means comprises means for filtering the signal to limit the signal to preselected frequencies which are characteristic of the damping of the forge member.

13. The apparatus of claim 12, further comprising means for converting the signal to a digital signal, and wherein said filtering means comprises a digital filter.

14. The apparatus of claim 12, wherein said measuring means further comprises means for measuring the time rate of change of magnitude of an envelope of the filtered signal.

15. The apparatus of claim 14, wherein said measuring means comprises means for measuring the log-decrement of the envelope.

16. The apparatus of claim 15, wherein said comparing means comprises means for comparing the log-decrement to a predetermined threshold value.

17. The apparatus of claim 16, wherein said predetermined threshold value comprises a value determined empirically by testing a plurality of different welds produced using different welding parameters so as to produce both acceptable and unacceptable welds, the predetermined threshold value being selected to be greater than the log-decrement values of the unacceptable welds.

18. The apparatus of claim 9 further comprising means for providing an output signal indicative of a defective weld.

19. An apparatus for determining the quality of welds produced by a percussion welding machine including a movable forging member for forcing a first part into engagement with a second part in the presence of a welding arc to produce fusion of the first and second parts which comprises an accelerometer affixed to the forging member for measuring the vibration of the forging member during welding and for producing a corresponding impulse signal; means for measuring the damping characteristic of the weld process by measuring the time rate of change of an envelope of the impulse signal; means for comparing the measured damping characteristic with a preselected threshold value; and means for providing an output indication of a defective weld upon the measured damping characteristic being less than the threshold value.

20. The apparatus of claim 19 further comprising means for converting the signal to a digital signal; means for digitally filtering the digital signal to limit the frequency content of the filtered signal to a predetermined band of frequencies; and wherein said measuring means and said comparing means comprises a digital computer.

* * * * *